US012115118B2

(12) United States Patent
Stokman et al.

(10) Patent No.: US 12,115,118 B2
(45) Date of Patent: Oct. 15, 2024

(54) PATIENT LIFT APPARATUS

(71) Applicant: Invacare International GmbH, Witterswil (CH)

(72) Inventors: Petrus Henricus Maria Stokman, Kaiseraugst (CH); Joaquim Ferreira, Santa Maria Da Feira (PT); Mark Monteiro, Badhoevedorp (NL); Stefan Lippert, Stuttgart (DE)

(73) Assignee: Invacare International GmbH, Witterswil (CH)

( * ) Notice: Subject to any disclaimer, the term of this patent is extended or adjusted under 35 U.S.C. 154(b) by 0 days.

(21) Appl. No.: 18/306,306

(22) Filed: Apr. 25, 2023

(65) Prior Publication Data

US 2023/0255844 A1 Aug. 17, 2023

Related U.S. Application Data

(62) Division of application No. 16/955,887, filed as application No. PCT/IB2018/059564 on Dec. 3, 2018, now Pat. No. 11,666,499.

(30) Foreign Application Priority Data

Dec. 19, 2017 (EP) .................................... 17208554

(51) Int. Cl.
*A61G 7/10* (2006.01)

(52) U.S. Cl.
CPC ......... *A61G 7/1017* (2013.01); *A61G 7/1061* (2013.01); *A61G 2203/723* (2013.01)

(58) Field of Classification Search
CPC ................ A61G 7/1017; A61G 7/1061; A61G 2203/723; A61G 7/1046; A61G 7/1051;
(Continued)

(56) References Cited

U.S. PATENT DOCUMENTS

2010/0005585 A1* 1/2010 Spidare ................ A61G 7/1017 5/83.1
2012/0240333 A1* 9/2012 Niklasson ............ A61G 7/1017 5/83.1

FOREIGN PATENT DOCUMENTS

WO WO-9415570 A1 * 7/1994 ............... A61G 5/10
WO WO-2013034936 A1 * 3/2013 ........... A61G 7/1013

OTHER PUBLICATIONS

"Integral." Dicitionary.com, www.dictionary.com/browse/integral (Year: 2017).*

(Continued)

*Primary Examiner* — David R Hare
*Assistant Examiner* — Madison Emanski
(74) *Attorney, Agent, or Firm* — Calfee, Halter & Griswold LLP

(57) ABSTRACT

There is described a patient lift apparatus comprising a supporting frame, a boom portion connected to the supporting frame, and a spreader element coupled to the boom portion via a coupling member. The boom portion and coupling member are joined by a pivot joint allowing the coupling member and associated spreader element to pivot with respect to the boom portion about a pivot axis. The patient lift apparatus can include a damping element coupled between the boom portion and the coupling member to damp rocking movement of the coupling member and spreader element, which damping element is a linear damper having a first end connected to the boom portion and a second end connected to the coupling member. The patient lift apparatus can include a quick release mechanism to release the spreader element from the boom portion.

15 Claims, 11 Drawing Sheets

(58) Field of Classification Search
CPC .......... B66C 23/48; A61H 3/008; A61H 3/04; F16B 19/00
USPC ................................ 5/83.1, 86.1, 89.1, 87.1
See application file for complete search history.

(56) References Cited

OTHER PUBLICATIONS

"Knob." Vocabulary.com, www.vocabulary.com/dictionary/knob (Year: 2016).*
"Dovetail." Google, www.google.com/search?q=dovetail+joint+definition.*

* cited by examiner

PATIENT LIFT APPARATUS

CROSS-REFERENCE TO RELATED APPLICATIONS

This application is a divisional application of U.S. Ser. No. 16/955,87, filed on Jun. 19, 2020, which is a 371 of PCT Application No. PCT/IB2018/059564 filed on Dec. 3, 2018, which claims priority to European Application No. 17208554.0 filed on Dec. 19, 2017, the contents of which are hereby incorporated by reference as if recited in their entirety.

TECHNICAL FIELD

The present invention generally relates to a patient lift apparatus employed for lifting and transferring patients, which apparatus is especially intended to be used in the health care industry.

BACKGROUND OF THE INVENTION

Patient lift apparatuses are generally known in the art. These apparatuses are an important tool for caregivers and medical staff, which tool greatly helps and facilitates patient handling. These apparatuses prevent personnel injuries, especially back injuries, and ensure dignity in patient handling.

Such patient lift apparatuses are for instance disclosed in International (PCT) Publications Nos. WO 2010/006240 A1 and WO 2011/036140 A1, which publications are incorporated herein by reference. Both publications disclose a patient lift apparatus in accordance with the preamble of independent claims 1 and 7, namely a patient lift apparatus comprising a supporting frame, a boom portion connected to the supporting frame, and a spreader element coupled to the boom portion via a coupling member, the boom portion and coupling member being joined by a pivot joint allowing the coupling member and associated spreader element to pivot with respect to the boom portion about a pivot axis.

In some other instances, the spreader element may be connected to the boom portion via a simple carabiner arrangement, which arrangement facilitates exchange of the spreader element but is however detrimental in that the spreader element may swing in any direction around the connection point to the boom. Such solutions, while simpler in configuration, therefore require great care from the caregiver to avoid injuries to the patient.

According to International (PCT) Publication No. WO 2011/036140 A1, a friction coupling is provided at the pivot joint, which friction coupling is designed to restrict pivoting movement of the coupling member and associated spreader element. In one embodiment, the friction coupling may furthermore comprise a viscous-type rotary damper, which damper acts to dampen rotation of the coupling member (and associated spreader element) with respect to the boom portion.

While this solution is adapted to restrict erratic movement of the coupling member and associated spreader element during handling of the patient lift apparatus, the damping function and efficiency of this solution is somewhat limited, especially with respect to a reduction of patient rocking movement.

Another problem with the solutions disclosed e.g. in International (PCT) Publications Nos. WO 2010/006240 A1 and WO 2011/036140 A1 resides in the coupling of the spreader element to the coupling member, which typically requires tools to allow exchange of the spreader element.

European Patent Publication No. EP 2 862 552 A1 discloses a patient lift apparatus comprising a supporting frame, a boom portion connected to the supporting frame, and a spreader element coupled to the boom portion via a quick-release link and quick-release hook. The quick-release link is specifically designed to be coupled to the boom portion by a lifting strap. The spreader element may accordingly swing in many directions about the lifting strap. The patient lift apparatus of European Patent Publication No. EP 2 862 552 A1 therefore suffers from substantially the same drawback as the known patient lift apparatuses that make use of the aforementioned carabiner arrangement to couple the spreader element to the boom portion.

European Patent Publication No. EP 1 645 260 A1 discloses a patient lift apparatus wherein a linear damper is provided between a boom portion and a mast of the supporting frame. This linear damper is merely exploited for the purpose of damping movement of the boom portion with respect to the mast, the main purpose of the linear damper being to prevent the boom portion from abruptly falling in case of failure of the boom actuator. Furthermore, the linear damper according to European Patent Publication No. EP 1 645 260 A1 is located such that it is exposed within the angle formed between the boom portion and the mast, which is detrimental in that this could potentially cause injuries to the patient and/or to the caregivers and medical staff handling the apparatus.

There is therefore a need for an improved solution.

SUMMARY OF THE INVENTION

A general aim of the invention is to provide a patient lift apparatus of the aforementioned type, which improves ease of use and especially reduces patient rocking.

A further aim of the invention is to provide such a patient lift apparatus that allows faster and easier exchange of the spreader element and which does not compromise patient handling.

Yet another aim of the invention is to provide such a solution that guarantees that the spreader element is adequately connected to the boom portion and cannot be inadvertently released.

These aims are achieved thanks to the solutions defined in the claims.

In accordance with a first aspect of the invention, as recited in independent claim 1, there is provided a patient lift apparatus comprising a supporting frame, a boom portion connected to the supporting frame, and a spreader element coupled to the boom portion via a coupling member, the boom portion and coupling member being joined by a pivot joint allowing the coupling member and associated spreader element to pivot with respect to the boom portion about a pivot axis. According to this first aspect of the invention, the patient lift apparatus further comprises a damping element coupled between the boom portion and the coupling member to damp rocking movement of the coupling member and spreader element, which damping element is a linear damper having a first end connected to the boom portion and a second end connected to the coupling member.

The damping element is preferably a pneumatic or hydraulic damper.

According to a particularly advantageous embodiment of the invention, the damping element is located completely within an inner space of the boom portion. This solution is particularly advantageous in that no part of the damping element projects outside of the boom portion, which considerably reduces the risk of injury.

The patient lift apparatus may further comprises a quick release mechanism to release the spreader element from the boom portion.

In accordance with a particularly preferred embodiment of the invention, the quick release mechanism is an integral part of the coupling member, which coupling member comprises a first coupling element that is pivotably coupled to the boom portion and a second coupling element that is connected to the spreader element and releasably coupled to the first coupling element, thus forming a releasable coupling section between the first and second coupling elements. In this context, the second end of the damping element may in particular be connected to the first coupling element at a point of attachment that is offset with respect to the pivot axis of the pivot joint.

The aforementioned combination of the damping element and quick release mechanism forming an integral part of the coupling member is particularly advantageous in that a quick release and exchange of the spreader element from the boom portion is made possible, without this compromising or affecting the desired damping function. The known solutions implementing a damping function, as for instance disclosed in International (PCT) Publication No. WO 2011/036140 A1, do not allow to achieve this particularly advantageous result.

It will be appreciated that the aforementioned quick release mechanism is also a valuable improvement over the known solutions, independently of the use of the damping element. Therefore, in accordance with a second aspect of the invention, as recited in independent claim 7, there is also provided a patient lift apparatus comprising a supporting frame, a boom portion connected to the supporting frame, and a spreader element coupled to the boom portion via a coupling member, the boom portion and coupling member being joined by a pivot joint allowing the coupling member and associated spreader element to pivot with respect to the boom portion about a pivot axis. According to this other aspect of the invention, the patient lift apparatus further comprises a quick release mechanism to release the spreader element from the boom portion. This quick release mechanism is an integral part of the coupling member, which coupling member comprises a first coupling element that is pivotably coupled to the boom portion and a second coupling element that is connected to the spreader element and releasably coupled to the first coupling element, thus forming a releasable coupling section between the first and second coupling elements.

The aforementioned releasable coupling section may in particular be designed as a dovetail connection between the first and second coupling elements, in which case the first coupling element may especially comprise a T-shaped extension and the second coupling element a corresponding T-shaped opening adapted to receive the T-shape extension and secure the first coupling element to the second coupling element.

In accordance with this preferred embodiment, the second coupling element can advantageously be releasably translatable with respect to the first coupling element, in which case translation of the second coupling element with respect to the first coupling member preferably takes place along an inclined plane. Furthermore, the releasable coupling section may in particular be designed in such a way that the second coupling element comes to rest against the first coupling element and is supported by the first coupling element when coupled one with the other.

In accordance with a particularly advantageous aspect of the invention, the releasable coupling section may in particular be designed in such a way that complete coupling of the second coupling element onto the first coupling element is ensured by gravity, the second coupling element being automatically locked onto the first coupling element upon complete coupling of the first and second coupling elements.

The quick release mechanism may further comprise a locking-unlocking mechanism adapted to automatically lock and secure the first and second coupling elements one with the other and to manually unlock and release the first and second coupling elements one from the other. In this latter case, the locking-unlocking mechanism can advantageously comprise a movable locking member that is adapted to move alongside a guide portion of the first coupling element between a locking position, in which the movable locking member partly engages into a retaining portion provided in the second coupling element, and an unlocking position, in which the movable locking member is disengaged from the retaining portion. This movable locking member can especially be designed to slide inside a hollow portion of the first coupling element, which hollow portion acts as the guide portion, and to cooperate with a corresponding bore provided in the second coupling element, which bore acts as the retaining portion.

The movable locking member is advantageously moved to the locking position and pressed into engagement with the retaining portion under the action of a spring, the movable locking member being selectively movable to the unlocking position and disengaged from the retaining portion under the action of a manually-actuatable release knob, which knob is preferably positioned along the guide portion and forms and integral part of the movable locking member.

By way of preference, the quick release mechanism is designed to allow toolless release of the spreader element.

Further advantageous embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in relation to various illustrative embodiments. It shall be understood that the scope of the invention encompasses all combinations and sub-combinations of the features of the patient lift apparatus disclosed herein.

As described herein, when two or more parts or components are described as being connected or coupled to one another, they can be so connected or coupled directly to each other or through one or more intermediary parts.

Figure 1:
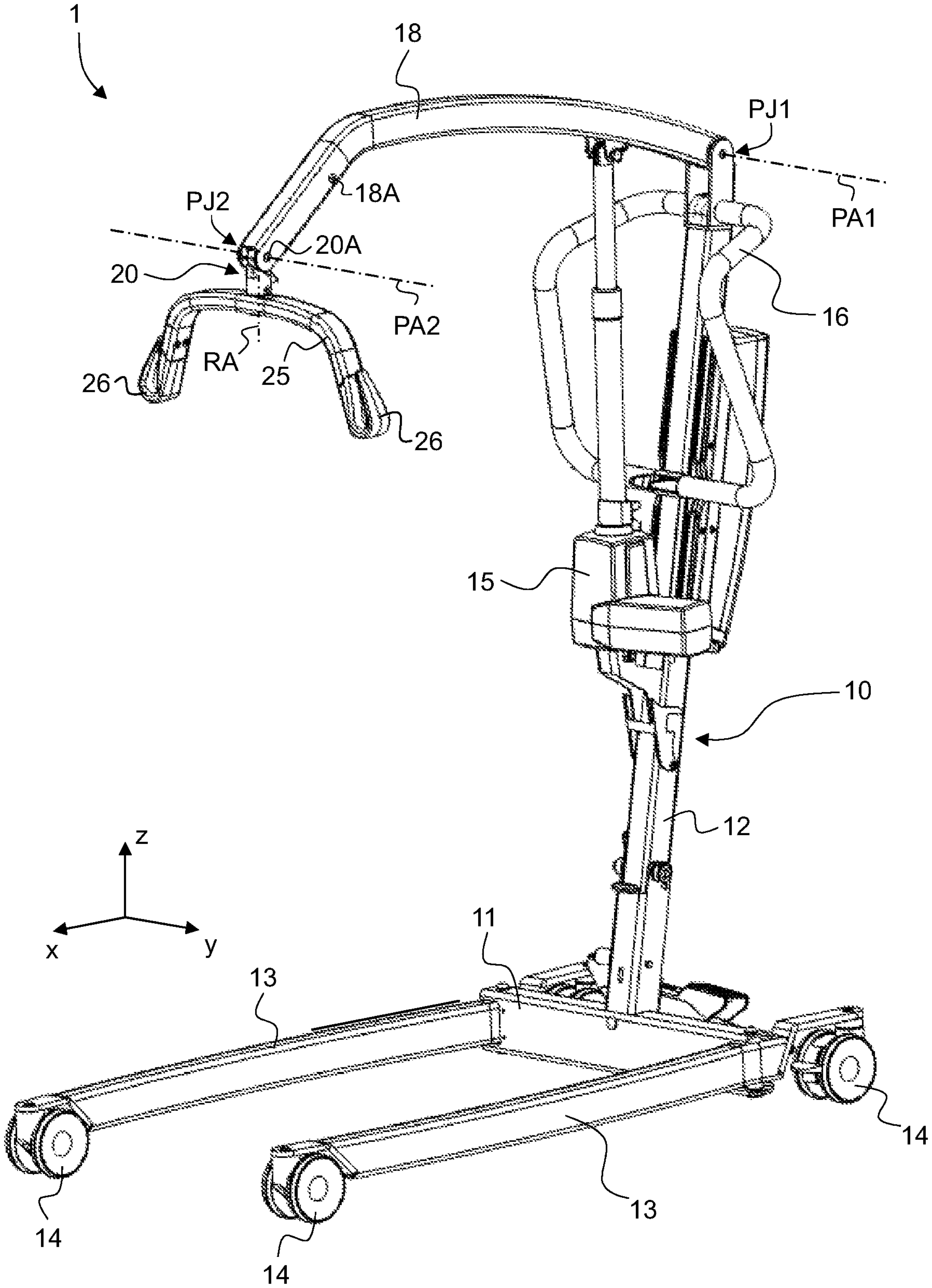
FIG. 1 is a perspective view of a patient lift apparatus in accordance with a preferred embodiment of the invention.

Referring to FIG. 1, there is shown a perspective view of a patient lift apparatus 1 in accordance with a preferred embodiment of the invention. Apparatus 1 include a supporting frame 10 comprising a base 11, a mast 12 and legs 13 provided at their ends with casters 14. A suitable steering handle 16 is provided on the mast 12 to allow a caregiver to move and position the apparatus 1 according to the needs.

A boom portion 18 is connected to the supporting frame 10, namely to mast 12, via a first pivot joint PJ1 thereby allowing the boom portion 18 to pivot with respect to the mast 12 about a pivot axis PA1. Pivot axis PA1 is understood to be parallel to the y-axis of the Cartesian coordinate system x-y-z depicted in FIG. 1, x-y designating by convention a horizontal plane and z a vertical axis perpendicular to the horizontal plane x-y. An actuator 15 is further provided to mechanically assist pivotal movement of the boom portion 18 with respect to the mast 12, which actuator 15 is mounted on mast 12 and connected at one end to the boom portion 18. This actuator 15 can for instance be an electrically driven screw-type, hydraulic or pneumatic actuator, as is known in the art.

Positioned at a distal end of the boom portion 18, there is provided a spreader element (or spreader bar) 25 which is coupled to the boom portion 18 via a coupling member 20. Coupling member 20 is connected to the boom portion 18 via a second pivot joint PJ2 thereby allowing the coupling member 20 (and associated spread element 25) to pivot with respect to the boom portion about a pivot axis PA2 (which other pivot axis PA2 is likewise understood to be parallel to the y-axis). Reference sign 20A in FIG. 1 designates a point of attachment of the coupling member 20 to the boom portion 18, which point of attachment 20A is located on pivot axis PA2.

By restricting movement along the y-axis and allowing the coupling member 20 and associated spreader element 25 to pivot only in the x-z plane thanks to the pivot joint PJ2, one ensures stability of the spreader element 25 when the patient lift apparatus 1 is moved in an unloaded state, i.e. without any patient. The spreader element 25 is thus held in a stable configuration when approaching a patient, thereby reducing the risk to hit the patient's head.

The spreader element 25 depicted in FIG. 1 is shown as a two-point spreader bar comprising two hook portions 26 at both ends of the spreader element 25, which hook portions 26 are used to attach a sling (not shown) for holding a patient during lifting and transfer. The illustrated spreader element 25 is by no means limiting the scope of the invention and other spreader elements could be used, including spreader elements of varying dimensions and sizes as well as of different types such as four-point spreader bars. As a matter of fact, one key feature of the present invention resides in that the spreader element 25 is designed to be easily exchangeable as this will become apparent from reading further the following description. The spreader element 25 is designed to be freely rotatable with respect to the coupling member 20 about a rotation axis RA.

Figure 2:
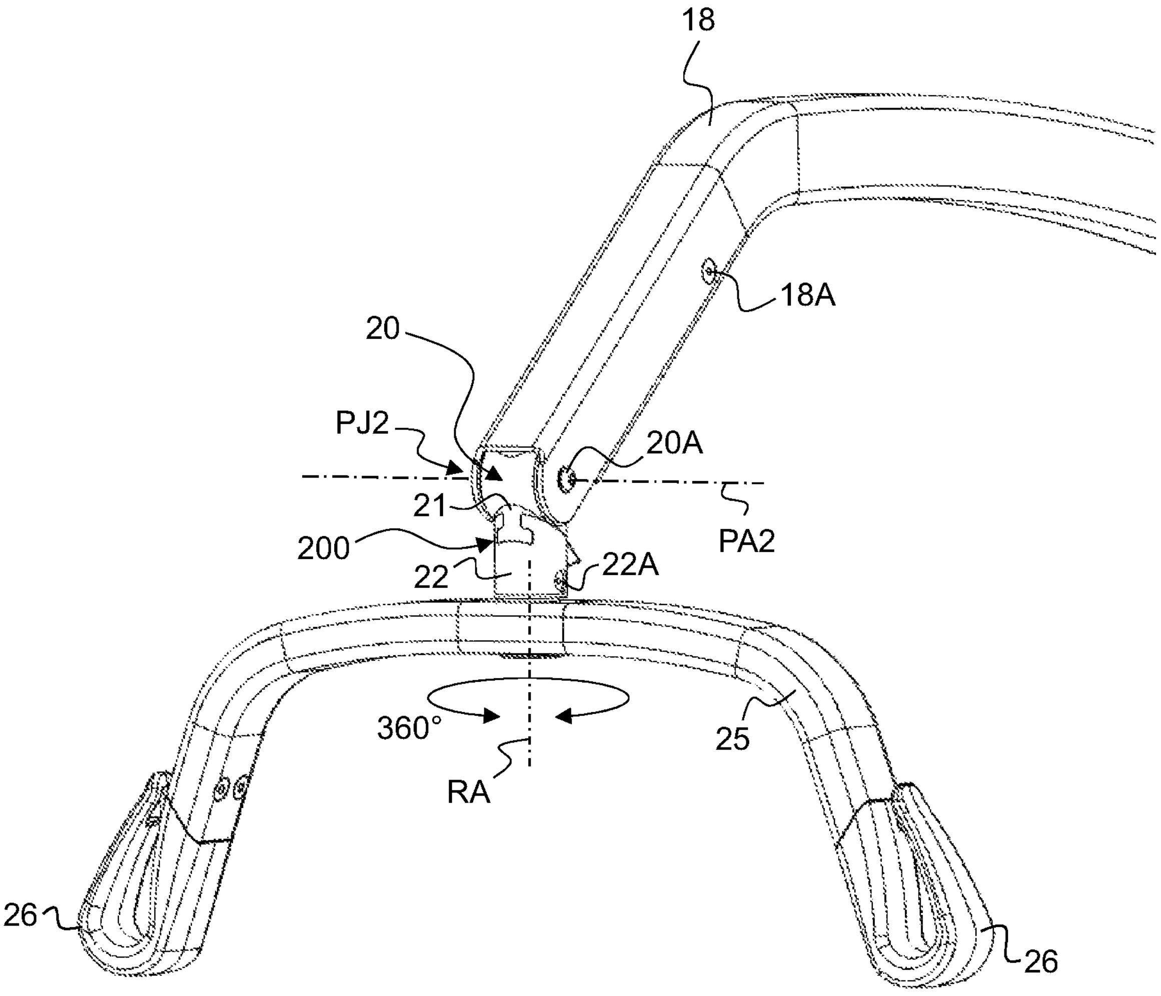
FIG. 2 is an enlarged view showing in greater detail the coupling arrangement between the boom portion, coupling member and spreader element of the patient lift apparatus of FIG. 1.

FIG. 2 is an enlarged view showing in greater detail the coupling arrangement between the boom portion 18, coupling member 20 and spreader element 25 of the patient lift apparatus 1 of FIG. 1. FIG. 2 shows that the coupling member 20 of the preferred embodiment actually comprises two coupling elements 21, 22, namely a first, upper coupling element 21 and a second, lower coupling element 22, which coupling elements 21, 22 are connected one to the other via a quick release mechanism that will be described in greater detail hereafter.

In the illustrated embodiment, the quick release mechanism is advantageously an integral part of the coupling member 20, the first coupling element 21 being pivotably coupled to the boom portion 18 at the point of attachment 20A so as to pivot about pivot axis PA2 and form pivot joint PJ2, while the second coupling element 22 is connected to the spreader element 25 (via a point of attachment 22A) and releasably coupled to the first coupling element 21, thus forming a releasable coupling section 200 between the first and second coupling elements 21, 22.

By way of preference, the quick release mechanism of the invention is designed to allow toolless release of the spreader element 25, but modifications could be envisaged to require the use of tools to perform assembly and disassembly of the spreader element 25 from the boom portion 18 should this be necessary or desired.

In the illustrated embodiment, the releasable coupling section 200 is designed as a dovetail connection between the first and second coupling elements 21, 22. Other types of connecting arrangements could however be contemplated to secure the coupling elements 21, 22 one with respect to the other and provide the desired function of quick release mechanism of the invention.

Figure 3:
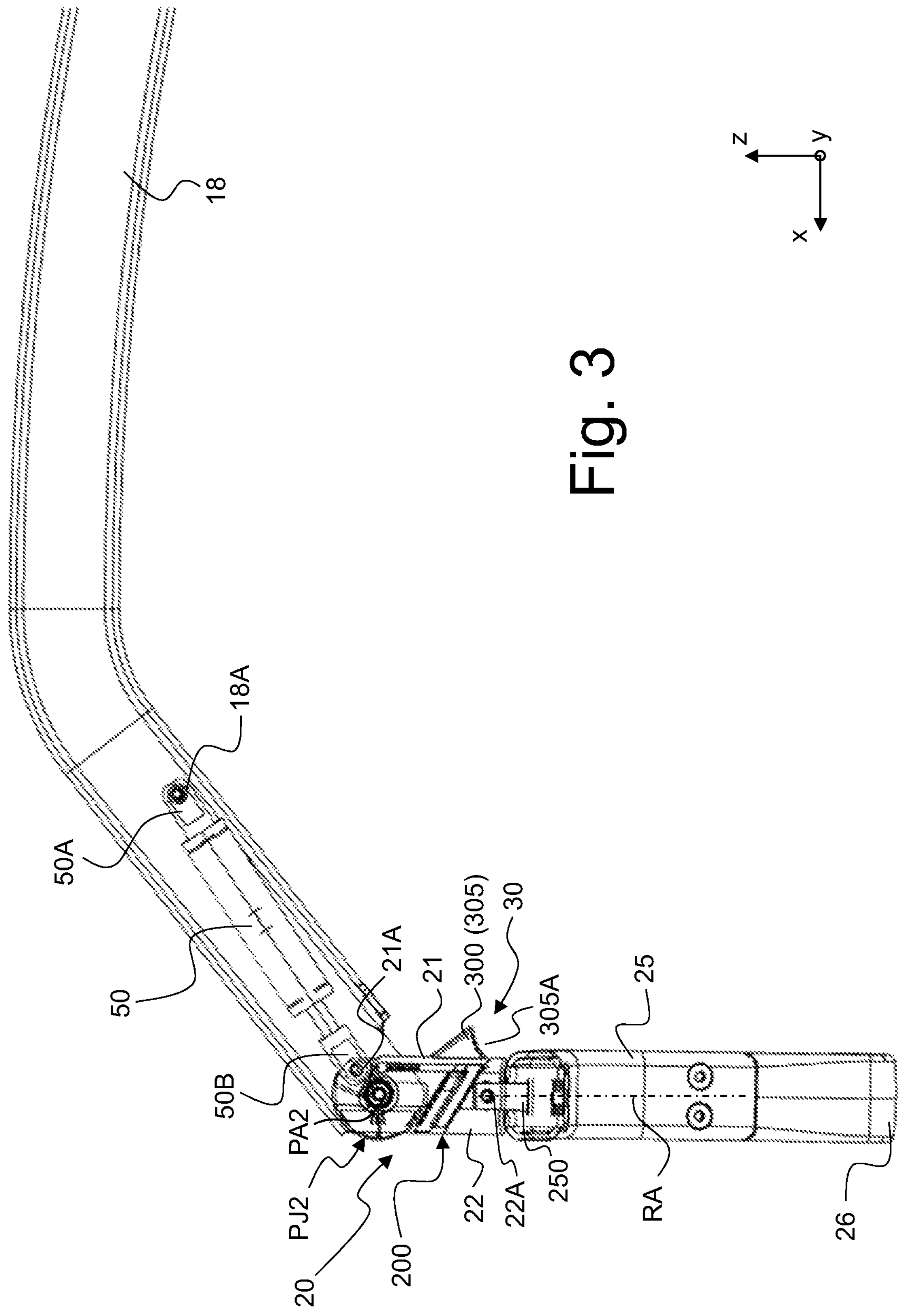
FIG. 3 is a cross-sectional view of the coupling arrangement of FIG. 2 taken along a x-z plane.
Figure 4:
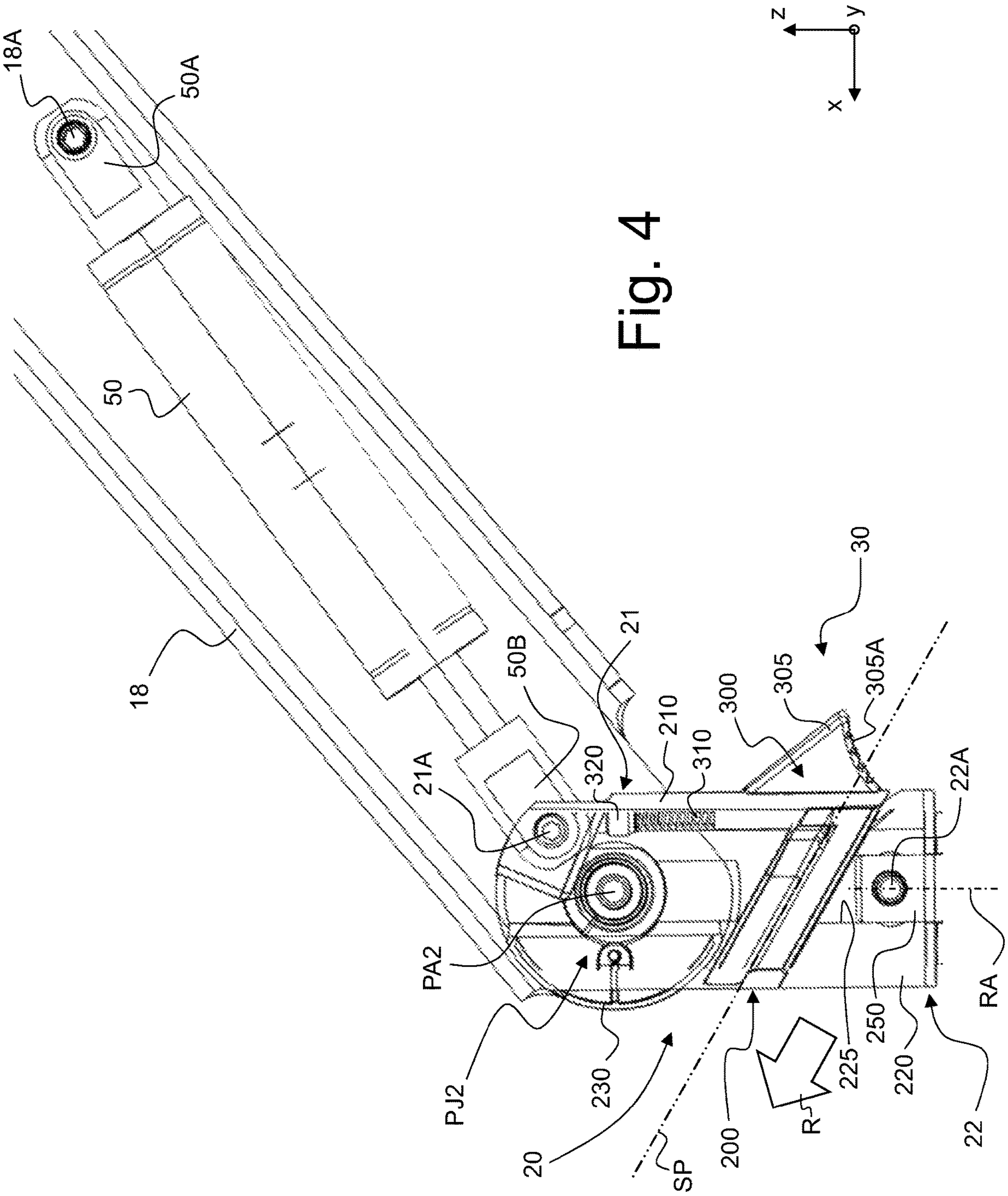
FIG. 4 is an enlarged view of the cross-sectional view of FIG. 3.

FIGS. 3 and 4 are cross-sectional views of the coupling arrangement of FIG. 2 taken along a x-z plane, namely a plane perpendicular to pivot axis PA2 of pivot joint PJ2. FIGS. 3 and 4 highlights another part of the quick release mechanism in accordance with this preferred embodiment of the invention, namely a locking-unlocking mechanism 30 that is provided on a rear part of the coupling member 20. This locking-unlocking mechanism 30 is adapted to automatically lock and secure the first and second coupling elements 21, 22 one with the other and to manually unlock and release the first and second coupling elements 21, 22 one from the other. Also shown in FIGS. 3 and 4 is a movable locking member 300 of the locking-unlocking mechanism 30. Reference signs 305 and 305A respectively designate a manually-actuatable release knob and contact surface thereof, which knob 305 is used to manually unlock and release the first and second coupling elements 21, 22 and allow separation thereof at the coupling section 200.

FIGS. 3 and 4 further illustrate that the second, lower coupling element 22 is coupled to the spreader element 25 via a swivel axis 250, which allows free rotation of the spreader element 25 about the rotation axis RA. The swivel axis 250 is located inside a through-hole 225 provided in the second coupling element 22 (which through-hole 225 is coaxial with rotation axis RA) and held onto the second coupling element 22 at point of attachment 22A. The swivel axis 250 is also partly visible in FIG. 6 mounted on the second coupling element 22 via the point of attachment 22A.

FIGS. 3 and 4 also illustrate another important aspect of the invention, namely the provision of a damping element 50 that is coupled between the boom portion 18 and the coupling member 20. This damping element 50 is designed to damp rocking movement of the coupling member 20 and associated spreader element 25, i.e. movement about the pivot axis PA2. This damping element is a linear damper having a first end 50A connected to the boom portion 18 at point of attachment 18A (which point of attachment 18A is also visible in FIGS. 1 and 2) and a second end 50B connected to the coupling member 20, namely to the first, upper coupling element 21, at a point of attachment 21A that is offset with respect to the pivot axis PA2 of pivot joint PJ2 in order to damp rocking movement about axis PA2. Linear damper 50 can in particular be a pneumatic or hydraulic damper.

By way of preference, as illustrated in FIGS. 3 and 4, the damping element 50 is located completely within an inner space of the boom portion 18, thereby ensuring that no part of the damping element 50 protrudes outside of the boom portion 18.

Tests carried out by the Applicant have in particular demonstrated that the provision of damping element 50 ensures an efficient damping of the patient rocking movement and greatly improves comfort for the patient as a result, which is a considerable improvement over the known solutions. Indeed, the damping arrangement of the invention allows to drastically and quickly reduce the amplitude of movement of the patient after only a few oscillation cycles. Rocking of the patient in a sling attached to the spreader element 25 is extremely reduced thanks to the invention, making the experience for a patient to be transferred a lot easier and causing less anxiety for the patient.

As schematically depicted in FIG. 4, the second coupling element 22 is releasably translatable with respect to the first coupling element 21 along a plane SP, which plane SP is preferably inclined. Arrow R in FIG. 4 indicates the direction in which the second, lower coupling element 22 is translated upon release. It shall be understood that, when in the coupled position, as depicted in FIG. 4, the second coupling element 22 rests against the first coupling element 21 and is supported by the first coupling element 21. Both elements 21, 22 are furthermore automatically locked one with respect to the other by means of the locking-unlocking mechanism 30.

Figure 5A:
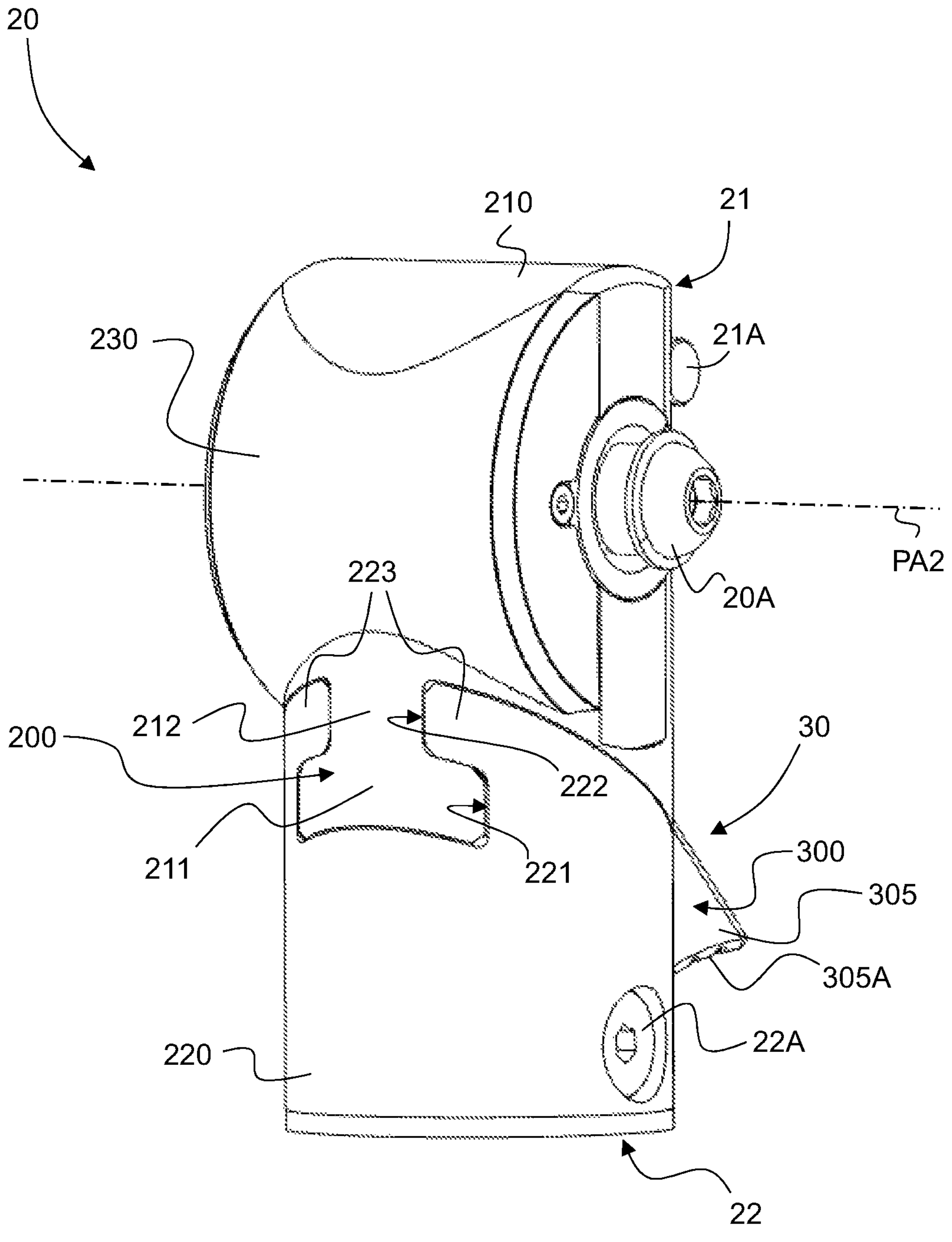
FIGS. 5A and 5B are perspective views of the coupling member shown in FIGS. 1 to 4 taken respectively from a front side and a rear side, which coupling member comprises first and second coupling elements coupled to one another by a releasable coupling section.
Figure 5B:
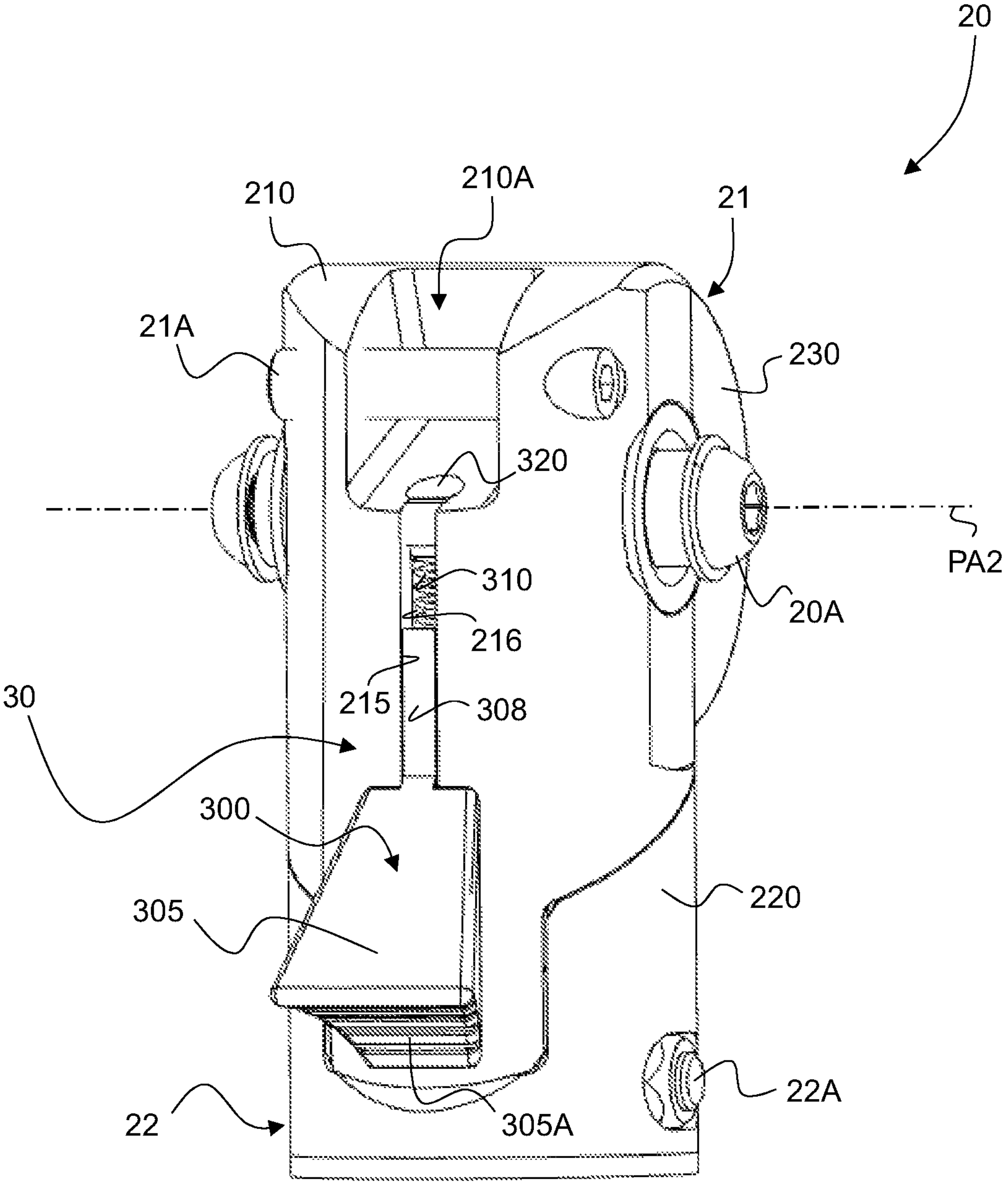

FIGS. 5A and 5B are perspective views of the coupling member 20 shown in FIGS. 1 to 4 taken respectively from a front side and a rear side along the x-axis. On the front side of the upper coupling element 21, there is provided an arc-shaped cover member 230 that forms a protruding portion on the front of the coupling member 20. This cover member 230 can be made e.g. of an adequate shock-absorbent material, such as soft plastic material or the like. This cover member 230 is held on a supporting structure (which supporting structure is visible in the cross-sectional view of FIG. 4) that is secured onto an upper coupling part 210 that forms a main body of the first coupling element 21. On a rear side of the upper coupling part 210, there is provided an aperture 210A that is dimensioned to receive the second end 50B of the aforementioned damping element 50 which is secured to the upper coupling part 210—and thus to the coupling member 20—at point of attachment 21A. The upper coupling part 210 also receives components designed to ensure the function of the pivot joint PJ2 at point of attachment 20A, allowing pivotal movement about pivot axis PA2.

As depicted in FIG. 5A, the upper coupling part 210 comprises a T-shaped extension 211 that protrudes downwards, with a neck portion 212 exhibiting a smaller width. This extension 211 is designed to cooperate and interact with a corresponding T-shaped opening 221 that is provided in a lower coupling part 220 forming a main body of the second coupling element 22. This T-shaped opening 221 likewise exhibits a neck portion 222 that conforms to the shape and dimensions of the neck portion 212, with a shoulder portion 223 on both sides. The T-shaped extension 211, T-shaped opening 221 and associated neck and shoulder portions 212, 222, 223 jointly form the dovetail connection that acts as the releasable coupling section 200 in the preferred embodiment. This dovetail connection 211, 212, 221, 222, 223 is also partly visible from the side in FIG. 6 and is discussed in greater detail hereafter with reference to FIGS. 7A-7B and 8A-8B.

The locking-unlocking mechanism 30 with its movable locking member 300 is provided on the rear side of the coupling member 20. As depicted in FIG. 5B, the movable locking member 300 is adapted to move alongside a guide portion 215, 216 of the first coupling element 21, namely a guide portion 215, 216 of the upper coupling part 210. In the illustrated embodiment, the guide portion 215, 216 comprises a longitudinal slit 215 that is formed in the upper coupling part 210, which longitudinal slit 215 is designed to interact with and guide a corresponding extension 308 of the movable locking member 300 (see also FIG. 6 where the extension 308 is visible). Also partly visible in FIG. 5B are a spring 310 located inside an upper end of a through-hole 216 formed in the upper coupling part 210 (which through-hole 216 also acts as guide portion for the movable locking member 300) as well as a retaining element 320 for the spring 310 that is secured at the upper end of through-hole 216. In the illustrated example, spring 310 is a compression spring that is interposed between the locking member 300 and the retaining element 320 and that presses the movable locking member 300 downwards to a locking position. In that respect, the manually-actuatable knob 305 is designed so that it can be pressed upwards, towards the spring 310, to unlock the locking-unlocking mechanism 30 and thereby allow release of the lower coupling element 22 from the upper coupling element 21. The contact surface 305A of the release knob 305 is preferably structured as illustrated to improve grip (see also FIG. 6).

Figure 6:
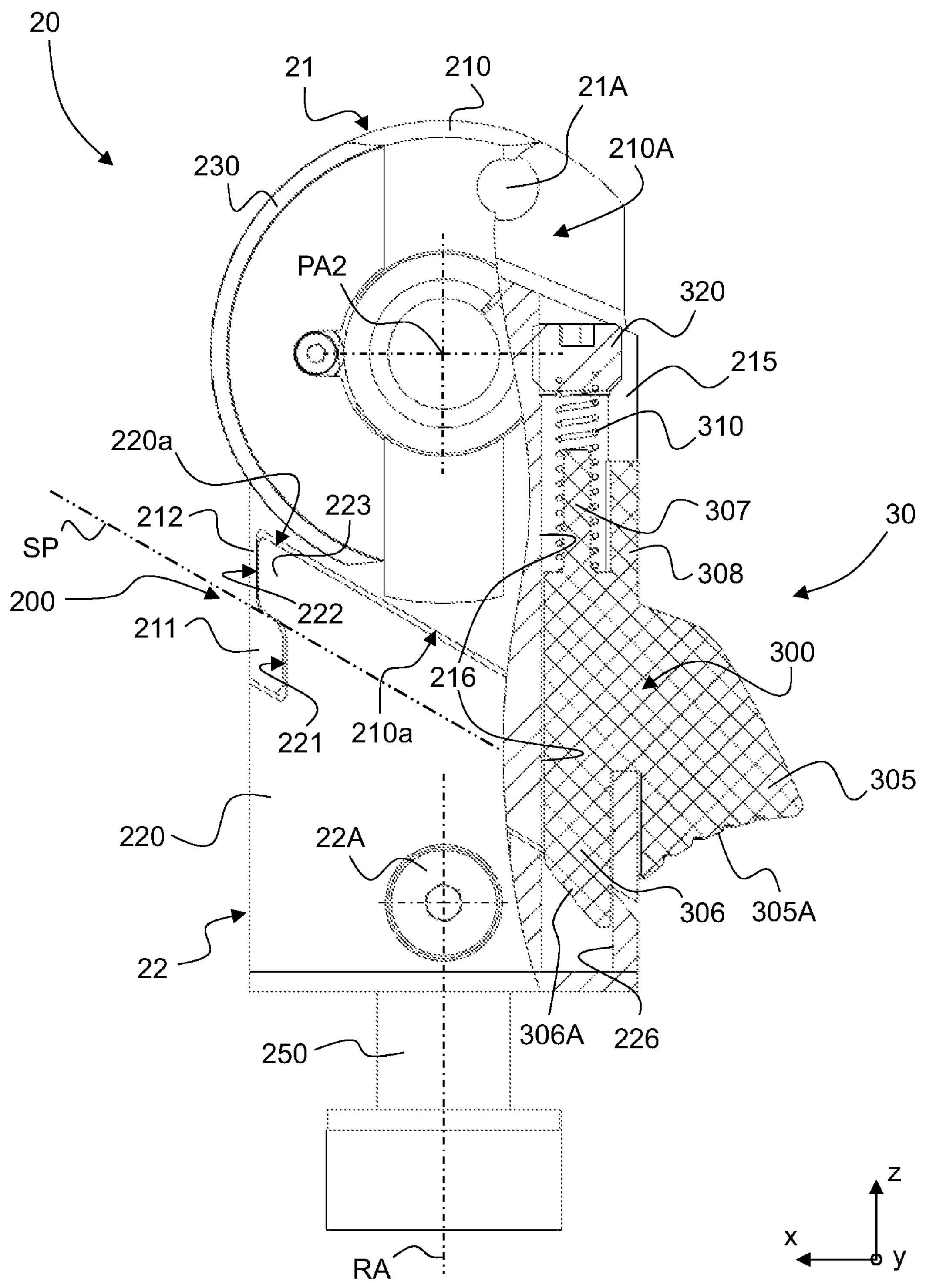
FIG. 6 is a cross-sectional view of the coupling member of FIGS. 5A and 5B taken along a x-z plane.

FIG. 6 is a cross-sectional view of the coupling member 20 of FIGS. 5A and 5B taken along the x-z plane, which cross-sectional view highlights the structure of the locking-unlocking mechanism 30 in accordance with the preferred embodiment. In particular, FIG. 6 shows a further extension 307 of the movable locking member 300, which extension cooperates with a lower part of the spring 310. This extension 307 is located together with the spring 310 on the upper end of through-hole 216, which through-hole 216 extends all the way down to the underside of the upper coupling part 210. FIG. 6 also shows that the manually-actuatable release knob 305 is positioned along the guide portion 215, 216 and preferably forms an integral part of the movable locking member 300.

In the illustration of FIG. 6, the movable locking member 300 is shown in the locking position, pressed downwards under the action of the spring 310. In that respect, the movable locking member 300 is further provided with a locking element 306 that extends downwards and that is designed to interact with a corresponding retaining portion 226 provided in the second coupling element 22, namely in the lower coupling part 220.

In the locking position, as depicted in FIG. 6, an end 306A of the locking element 306 cooperates with the retaining portion 226 to secure the upper and lower coupling parts 210, 220 one with respect to the other, and thus the first and second coupling elements 21, 22 of the coupling member 20. The end 306A is advantageously shaped to exhibit an inclined surface facilitating engagement of the locking member 300 into the retaining portion 226.

When the movable locking member 300 is moved manually upwards to an unlocking position by a corresponding actuation on the release knob 305, namely by pushing the movable locking member 300 against the force exerted by the spring 310, the locking element 306 and thus the movable locking member 300 can be disengaged from the retaining portion 226, allowing subsequent release of the lower coupling element 22 from the upper coupling element 21 along plane SP.

Figure 7A:
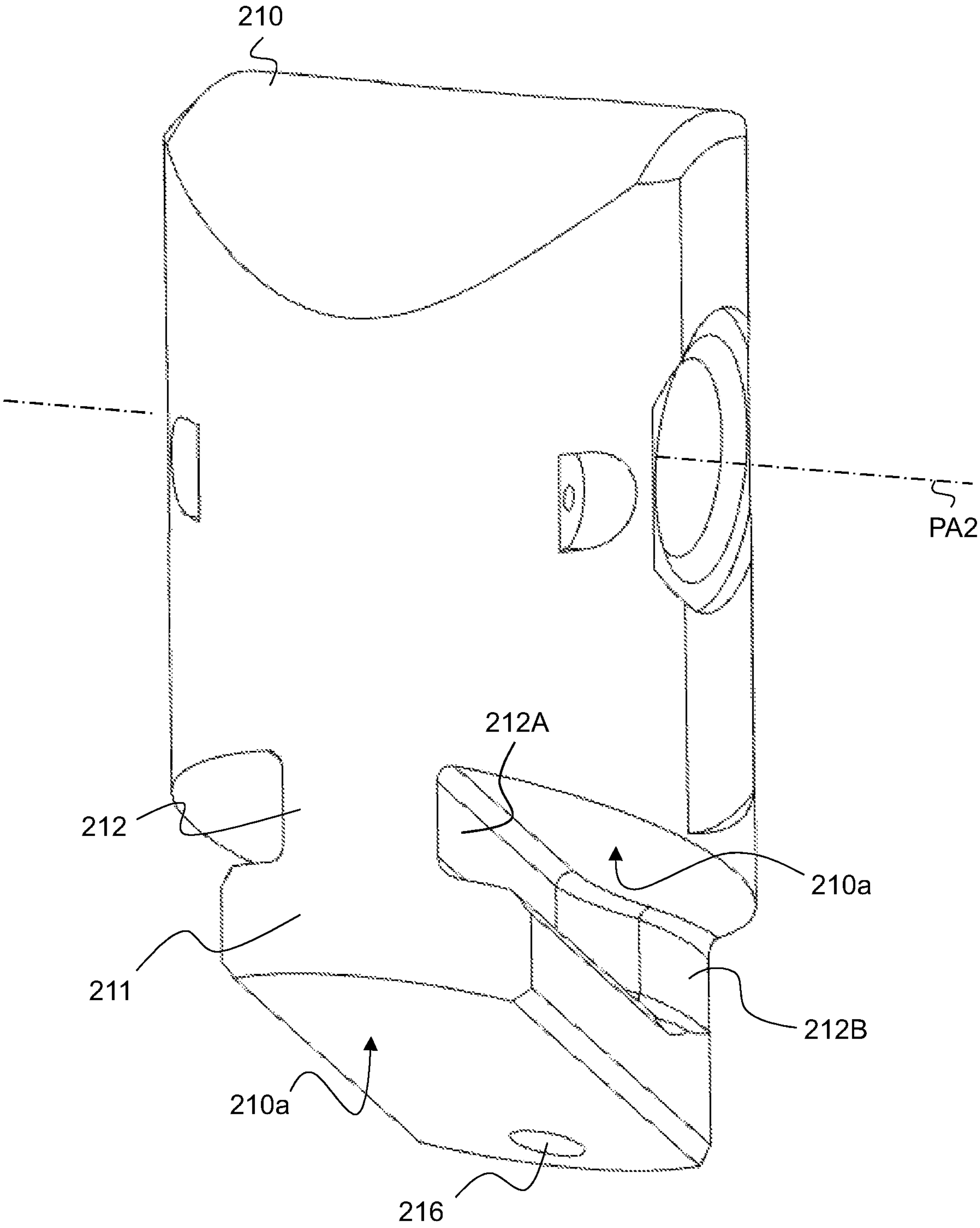
FIGS. 7A and 7B are perspective views of an upper coupling part of the coupling member shown in FIGS. 5A-5B and 6, which perspective views are taken respectively from a front side and a rear side.
Figure 7B:
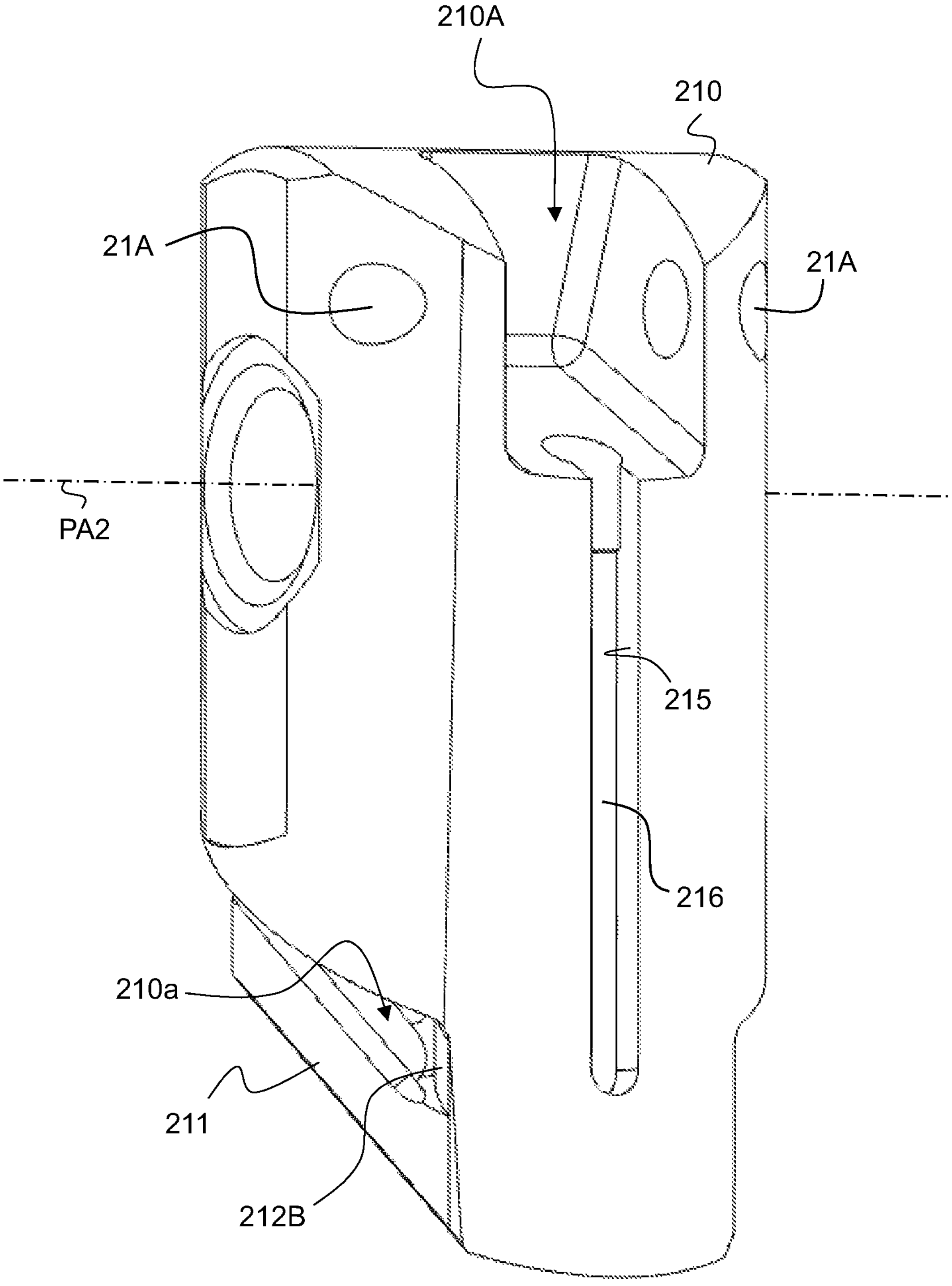
Figure 8A:
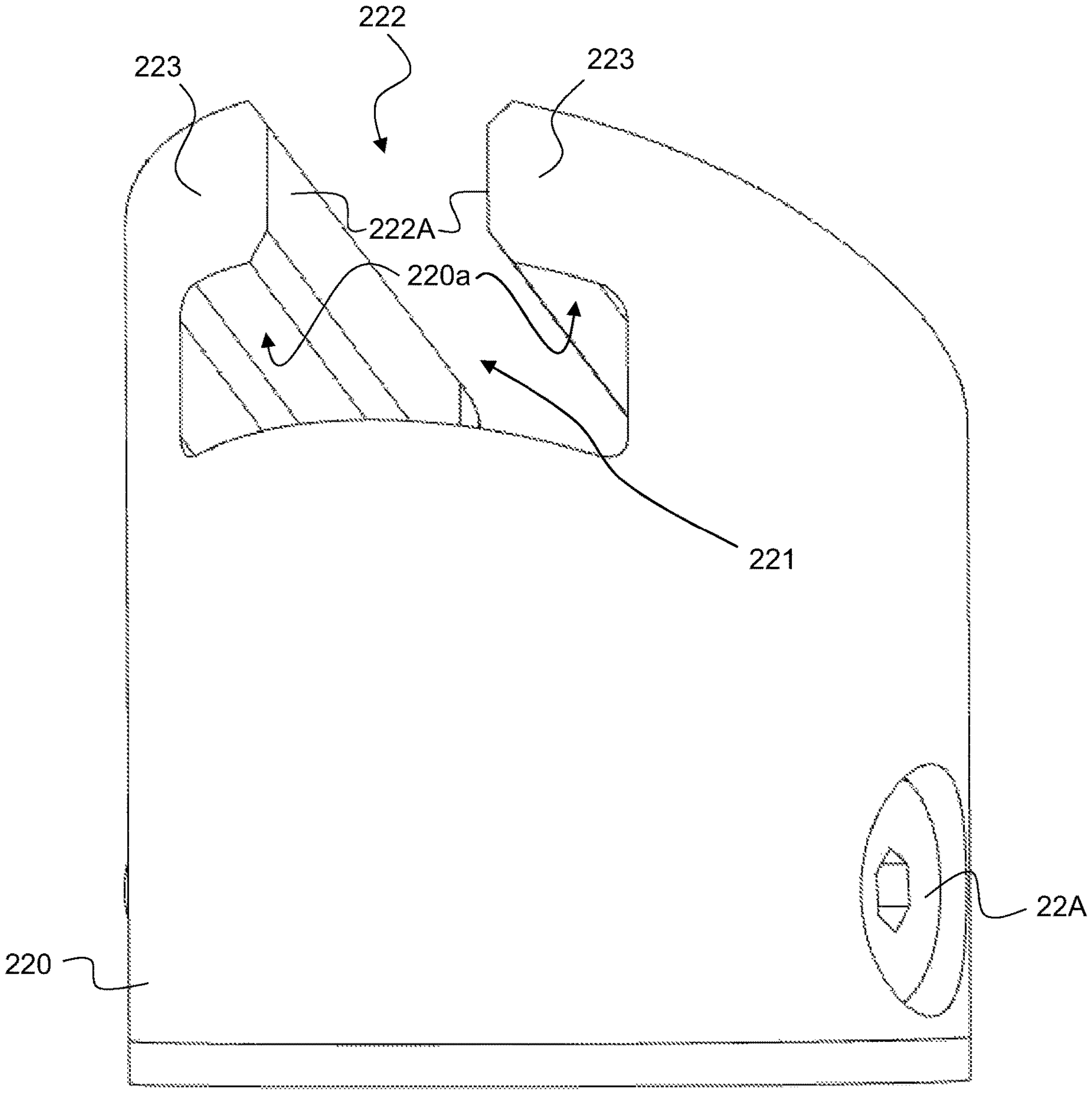
FIGS. 8A and 8B are perspective views of a lower coupling part of the coupling member shown in FIGS. 5A-5B and 6, which perspective views are taken respectively from a front side and a rear side.
Figure 8B:
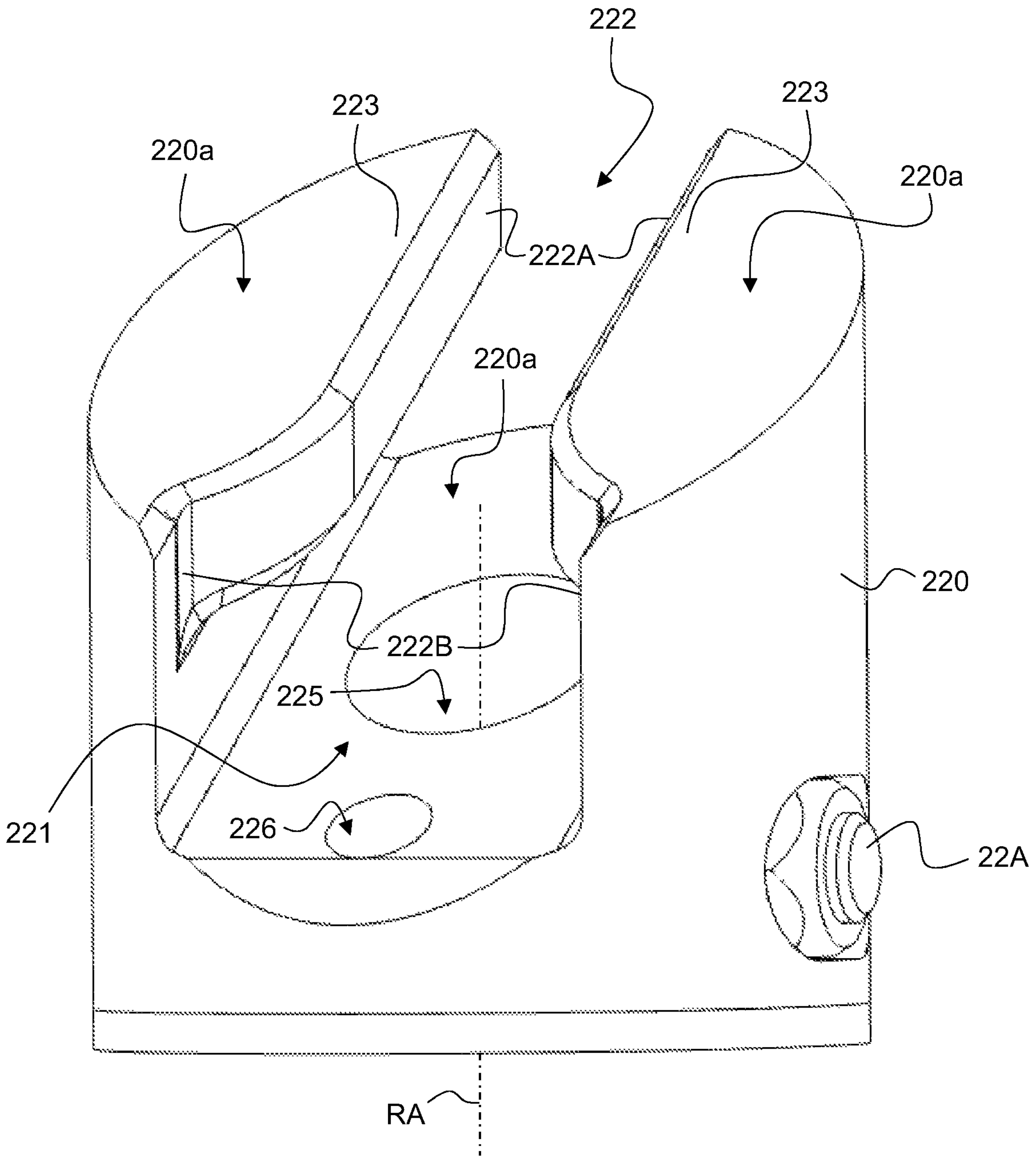

FIGS. 7A and 7B are perspective views of the upper coupling part 210, which perspective views are taken respectively from a front side and a rear side of the upper coupling part 210. FIGS. 8A and 8B are perspective views of the lower coupling part 220, which perspective views are likewise taken respectively from a front side and a rear side. As depicted in FIGS. 7A-7B and 8A-8B, sliding surfaces 210*a*, respectively 220*a*, are provided on the upper and lower coupling parts 210, 220 (which surfaces 210*a*, 220*a* are parallel to plane SP as depicted in FIG. 6) to form a sliding arrangement allowing translation of the lower coupling part 220 with respect to the upper coupling part 210.

FIG. 7A also shows the lower end of through-hole 216 formed in the upper coupling part 210, which through-hole 216 communicates with a bore acting as retaining portion 226 that is formed in a corresponding portion of the lower coupling part 220 as depicted in FIG. 8B.

In the illustrated embodiment, it will be appreciated that the movable locking member 300 is accordingly designed to slide inside a hollow portion (consisting of longitudinal slit 215 and through-hole 216) of the first coupling element 21, which hollow portion acts as guide portion, and to cooperate with a corresponding bore provided in the second coupling element 22, which bore acts as the retaining portion 226.

Adequate positioning and support of the lower coupling part 220 with respect to the upper coupling part 210 is advantageously ensured by an adequate design of the dovetail connection 211, 212, 221, 222, 223. More precisely, as depicted in FIGS. 7A and 7B, a rear end 212B of neck portion 212 is designed to be wider than a front end 212A of neck portion 212. As depicted in FIGS. 8A and 8B, a rear end 222B of neck portion 222 is likewise designed to be wider than a front end 222A of neck portion 222, the overall shape and dimensions of neck portion 222 matching that of neck portion 211. As a consequence, the shoulder portion 223 is wider at the front than at the rear as this is clearly visible on FIG. 8B. When the upper and lower coupling parts 210, 220 are coupled one to the other as depicted e.g. in FIGS. 4 to 6, the lower coupling part 220 comes in abutment with the upper coupling part 210, the rear end 212B of neck portion 212 acting as support for the shoulder portion 223 of the lower coupling part 220. This arrangement ensures perfect alignment of both parts 210, 220 one with respect to the other and guarantee automatic engagement of the locking member 300 in the retaining portion 226.

Also visible in FIG. 8B is the through-hole 225, which is coaxial with the axis of rotation RA and inside which the swivel axis 250 (not shown in FIG. 8B) is held via the point of attachment 22A.

Attachment of the spreader element 25 can be performed single handed thanks to the aforementioned coupling arrangement. In that respect, an advantage of the aforementioned coupling section 200 resides in that gravity will make sure that engagement of the second coupling element 22 onto the first coupling element 21 is complete and that both elements 21, 22 are automatically locked one with respect to the other thanks to mechanism 30, without this requiring any additional measure to secure the coupling. In the context of the aforementioned embodiment, the user actually gets an immediate feedback that mechanical engagement is complete when the locking member 300 automatically gets into engagement in the retaining portion 226 as soon as the second coupling element 22 comes to rest against the first coupling element 21. Detachment requires another hand to unlock the mechanism 30 by actuating the aforementioned release knob 305, which is typically a regulatory demand.

Various modifications and/or improvements may be made to the above-described embodiments without departing from the scope of the invention as defined by the annexed claims. For instance, other arrangements could be contemplated in order to implement the releasable coupling section between the first and second coupling elements, the dovetail connection being one possible but particularly advantageous and robust solution.

Furthermore, although the embodiments disclosed herein combine the use of a damping element and of a quick release mechanism, both features constitute independent features of the invention that could be implemented individually. The combination of both aspects however constitutes a particularly preferred solution in the context of the invention.

LIST OF REFERENCE NUMERALS AND SIGNS USED THEREIN

| | |
|---|---|
| 1 | patient lift apparatus |
| 10 | supporting frame |
| 11 | base |
| 12 | mast |
| 13 | legs |
| 14 | casters |
| 15 | actuator |
| 16 | steering handle |
| 18 | boom portion connected to supporting frame 10 and acting as supporting element for spreader element 25 |
| 18A | point of attachment of (first end 50A of) damping element 50 on boom portion 18 |
| 20 | coupling member acting as interface between boom portion 18 and spreader element 25 |
| 20A | point of attachment of coupling member 20 to boom portion 18 |
| 21 | first coupling element of coupling member 20 (pivotably coupled to boom portion 18) |
| 21A | point of attachment of (second end 50B of) damping element 50 on first coupling element 21 of coupling member 20 |
| 22 | second coupling element of coupling member 20 (connected to spreader element 25 and releasably coupled to first coupling element 21) |
| 22A | point of attachment of second coupling element 22 to spreader element 25 |
| 25 | spreader element (spreader/hanger bar) |
| 26 | hook portions for sling (not shown) |
| 30 | locking-unlocking mechanism (part of quick release mechanism) |
| 50 | damping element / linear damper |
| 50A | first end of damping element 50 that is connected to boom portion 18 (at point of attachment 18A) |
| 50B | second end of damping element 50 that is connected to coupling member 20 (at point of attachment 21A) |
| 200 | releasable coupling section between first and second coupling elements 21, 22 (part of quick release mechanism) |
| 210 | upper coupling part |

-continued

| | |
|---|---|
| 210A | opening on upper coupling part 210 adapted to receive second end 50B of damping element 50 |
| 210a | sliding surfaces of upper coupling part 210 cooperating with sliding surfaces 220a of lower coupling part 220 (parallel to plane SP) |
| 211 | T-shaped extension of upper coupling part 210 (cooperates with T-shaped opening 221 to form a dovetail connection) |
| 212 | neck portion of T-shaped extension 211 |
| 212A | front end of neck portion 212 |
| 212B | rear end of neck portion 212 |
| 215 | longitudinal slit in upper coupling part 210 acting as guide portion for movable locking member 300 |
| 216 | through-hole in upper coupling part 210 acting as guide portion for movable locking member 300 |
| 220 | lower coupling part |
| 220a | sliding surfaces of lower coupling part 220 cooperating with sliding surfaces 210a of upper coupling part 210 (parallel to plane SP) |
| 221 | T-shaped opening of lower coupling part 220 (cooperates with T-shaped extension 211 to form the dovetail connection) |
| 222 | neck portion of T-shaped opening 221 |
| 222A | front end of neck portion 222 |
| 222B | rear end of neck portion 222 |
| 223 | shoulder portion on both sides of neck portion 222 |
| 225 | through-hole in second coupling element 22 (lower coupling part 220) for accommodation of swivel axis 250 |
| 226 | retaining portion (e.g. bore) provided in second coupling element 22 (lower coupling part 220) |
| 230 | cover member |
| 250 | swivel axis for rotatable support of spreader element 25 onto coupling member 20 |
| 300 | movable locking member |
| 305 | manually-actuatable release knob |
| 305A | contact surface of knob 305 |
| 306 | locking element of movable locking member 300 |
| 306A | end of locking element 306 cooperating with retaining portion 226 in the locking position |
| 307 | extension of movable locking member 300 interacting with spring 310 |
| 308 | extension of movable locking member 300 interacting with longitudinal slit 215 |
| 310 | spring (e.g. compression spring) |
| 320 | retaining element for spring 310 |
| PA1 | pivot axis of boom portion 18 with respect to mast 12 / parallel to y-axis |
| PA2 | pivot axis of coupling member 20 (and associated spreader element 25) with respect to boom portion 18 / parallel to y-axis |
| PJ1 | pivot joint between boom portion 18 and mast 12 |
| PJ2 | pivot joint between coupling member 20 and boom portion 18 |
| RA | rotation axis of spreader element 25 with respect to coupling member 20 (rotatable over 360°) |
| SP | inclined plane along which the first and second coupling elements 21, 22 can be separated |
| R | direction along which the second coupling element 22 is releasable and separable from the first coupling element 21. |

The invention claimed is:

1. A patient lift apparatus comprising a supporting frame, a boom portion connected to the supporting frame, and a spreader element coupled to the boom portion via a coupling member, wherein the boom portion and coupling member by a pivot joint allowing the coupling member and associated spreader element to pivot with respect to the boom portion about a pivot axis, wherein the patient lift apparatus further comprises a quick release mechanism to release the spreader element from the boom portion, and wherein the quick release mechanism is an integral part of the coupling member, wherein the coupling member comprises a first coupling element that is pivotably coupled to the boom portion and a second coupling element that is connected to the spreader element via a point of attachment and releasably coupled to the first coupling element, thus forming a releasable coupling section between the first and second coupling elements allowing selective release of the spreader element from the boom portion.

2. The patient lift apparatus according to claim 1, wherein the releasable coupling section is designed as a dovetail connection between the first and second coupling elements.

3. The patient lift apparatus according to claim 2, wherein the first coupling element comprises a T-shaped extension and the second coupling element comprises a corresponding T-shaped opening adapted to receive the T-shaped extension and secure the first coupling element to the second coupling element.

4. The patient lift apparatus according to claim 1, wherein the second coupling element is releasably translatable with respect to the first coupling element.

5. The patient lift apparatus according to claim 4, wherein translation of the second coupling element with respect to the first coupling element takes place along an inclined plane.

6. The patient lift apparatus according to claim 1, wherein the releasable coupling section is configured such that the second coupling element comes to rest against the first coupling element and is supported by the first coupling element when coupled one with the other.

7. The patient lift apparatus according to claim 1, wherein the releasable coupling section is configured such that a complete coupling of the second coupling element onto the first coupling element is ensured by gravity and wherein the second coupling element is automatically locked onto the first coupling element upon the complete coupling of the first and second coupling elements.

8. The patient lift apparatus according to claim 1, wherein the quick release mechanism further comprises a locking-unlocking mechanism adapted to automatically lock and secure the first and second coupling elements one with the other and to manually unlock and release the first and second coupling elements one from the other.

9. The patient lift apparatus according to claim 8, wherein the locking-unlocking mechanism comprises a movable locking member that is adapted to move alongside a guide portion of the first coupling element between a locking position, in which the movable locking member partly engages into a retaining portion provided in the second coupling element, and an unlocking position, in which the movable locking member is disengaged from the retaining portion.

10. The patient lift apparatus according to claim 9, wherein the movable locking member is designed to slide inside a hollow portion of the first coupling element, wherein the hollow portion acts as the guide portion, and wherein the movable locking member is further configured to cooperate with a corresponding bore provided in the second coupling element, and wherein the bore acts as the retaining portion.

11. The patient lift apparatus according to claim 9, wherein the movable locking member is moved to the locking position and pressed into engagement with the retaining portion under an action of a spring and wherein the movable locking member is selectively movable to the unlocking position and disengaged from the retaining portion under an action of a manually-actuatable release knob.

12. The patient lift apparatus according to claim 11, wherein the manually-actuatable release knob is positioned along the guide portion and forms an integral part of the movable locking member.

13. The patient lift apparatus according to claim 1, wherein the quick release mechanism is designed to allow toolless release of the spreader element.

14. The patient lift apparatus according to claim 1, wherein the second coupling element is coupled to the spreader element via a swivel axis allowing free rotation of the spreader element about a rotation axis.

15. The patient lift apparatus according to claim 14, wherein the swivel axis is located inside a through-hole provided in the second coupling element, the through-hole being coaxial with the rotation axis, and wherein the swivel axis is held onto the second coupling element at the point of attachment.

* * * * *